United States Patent
Tokunaga et al.

(10) Patent No.: US 12,012,906 B2
(45) Date of Patent: Jun. 18, 2024

(54) STOP CONTROL DEVICE FOR INTERNAL COMBUSTION ENGINE

(71) Applicants: AISIN CORPORATION, Aichi (JP); Mazda Motor Corporation, Hiroshima (JP)

(72) Inventors: Yoshinari Tokunaga, Kariya (JP); Yuki Kasuya, Kariya (JP); Takano Nakai, Hiroshima-ken (JP); Kenichiro Suzuki, Hiroshima-ken (JP); Yoshiyuki Kamoyama, Hiroshima-ken (JP); Toru Hirota, Hiroshima-ken (JP)

(73) Assignees: AISIN CORPORATION, Aichi (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/002,728

(22) PCT Filed: May 11, 2021

(86) PCT No.: PCT/JP2021/017814
§ 371 (c)(1),
(2) Date: Dec. 21, 2022

(87) PCT Pub. No.: WO2022/004135
PCT Pub. Date: Jan. 6, 2022

(65) Prior Publication Data
US 2023/0243313 A1  Aug. 3, 2023

(30) Foreign Application Priority Data

Jul. 3, 2020  (JP) ................................ 2020-115609

(51) Int. Cl.
*F02D 13/02* (2006.01)
*F02D 13/08* (2006.01)
(Continued)

(52) U.S. Cl.
CPC ..... *F02D 13/0215* (2013.01); *F02D 13/0203* (2013.01); *F02D 13/0223* (2013.01);
(Continued)

(58) Field of Classification Search
CPC ............. F02D 13/0215; F02D 13/0203; F02D 13/0223; F02D 13/0234; F02D 13/0242;
(Continued)

(56) References Cited

U.S. PATENT DOCUMENTS 7,243,633 B2  7/2007  Berger
8,868,316 B2  10/2014  Kokubo et al.
(Continued)

FOREIGN PATENT DOCUMENTS

JP  2006125276 A  5/2006
JP  2006125342 A  5/2006
(Continued)

OTHER PUBLICATIONS

International Search Report (PCT/ISA/210) with translation and Written Opinion (PCT/ISA/237) dated Jun. 29, 2021, by the Japan Patent Office as the International Searching Authority for International Application No. PCT/JP2021/017814. (9 pages).
(Continued)

Primary Examiner — Audrey B. Walter
(74) Attorney, Agent, or Firm — BUCHANAN INGERSOLL & ROONEY PC

(57) ABSTRACT

A stop control device for an internal combustion engine is structured that stops the engine in a state suitable for starting and that does not cause a crank angle to change after the engine is stopped. A four-cycle internal combustion engine includes an electric valve opening and closing timing control device that sets an opening and closing timing of either or both of an intake valve and an exhaust valve. Stop control of stopping the internal combustion engine is performed (Continued)

when a stop signal for stopping the internal combustion engine is acquired, and post-stop phase control of displacing the opening and closing timing of the valve opening and closing timing control device in either an advancing direction or a retarding direction is performed after the internal combustion engine is stopped by the stop control.

8 Claims, 11 Drawing Sheets

(51) Int. Cl.
    *F02D 41/00*     (2006.01)
    *F02D 41/04*     (2006.01)

(52) U.S. Cl.
    CPC ..... *F02D 13/0234* (2013.01); *F02D 13/0242* (2013.01); *F02D 13/0249* (2013.01); *F02D 13/08* (2013.01); *F02D 41/009* (2013.01); *F02D 41/042* (2013.01); *F02D 2041/001* (2013.01)

(58) Field of Classification Search
    CPC .... F02D 13/0249; F02D 13/08; F02D 41/009; F02D 41/042; F02D 2041/001
    See application file for complete search history.

(56) References Cited

U.S. PATENT DOCUMENTS

| | | |
|---|---|---|
| 9,121,358 B2 | 9/2015 | Strehlau et al. |
| 2006/0102125 A1 | 5/2006 | Mashiki |
| 2011/0231077 A1* | 9/2011 | Nakamura ............. F02D 29/02 180/65.28 |
| 2011/0307135 A1* | 12/2011 | Ikeda .................... B60W 20/15 180/65.265 |
| 2014/0069362 A1 | 3/2014 | Hirata |
| 2015/0247467 A1* | 9/2015 | Suzuki ................ F02D 41/0002 123/346 |
| 2020/0072134 A1* | 3/2020 | Hotta ..................... F02D 29/02 |

FOREIGN PATENT DOCUMENTS

| | | |
|---|---|---|
| JP | 2006291792 A | 10/2006 |
| JP | 2011149379 A | 8/2011 |
| JP | 2011174434 A | 9/2011 |

OTHER PUBLICATIONS

The extended European Search Report dated Dec. 7, 2023, by the European Patent Office in corresponding European Patent Application No. 21832881.3-1004. (7 pages).

* cited by examiner

FIG. 1
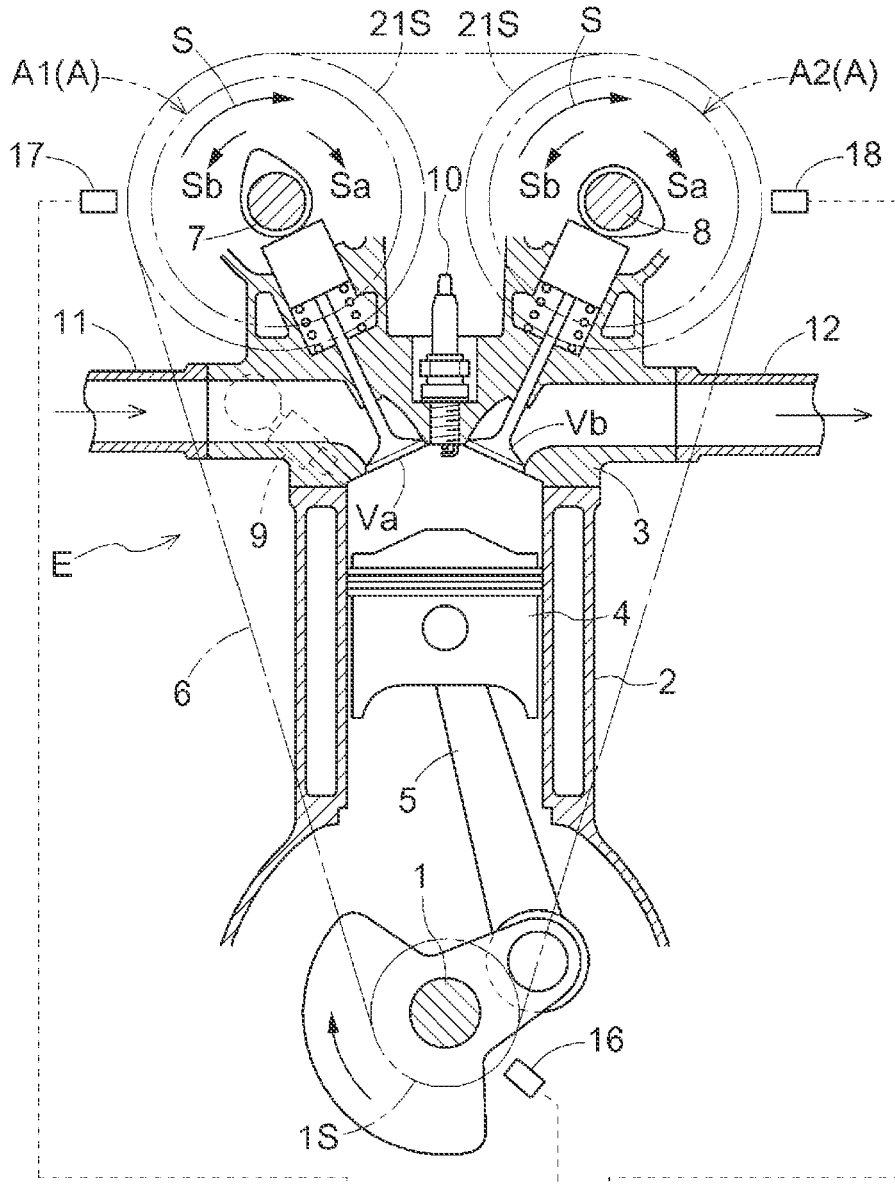
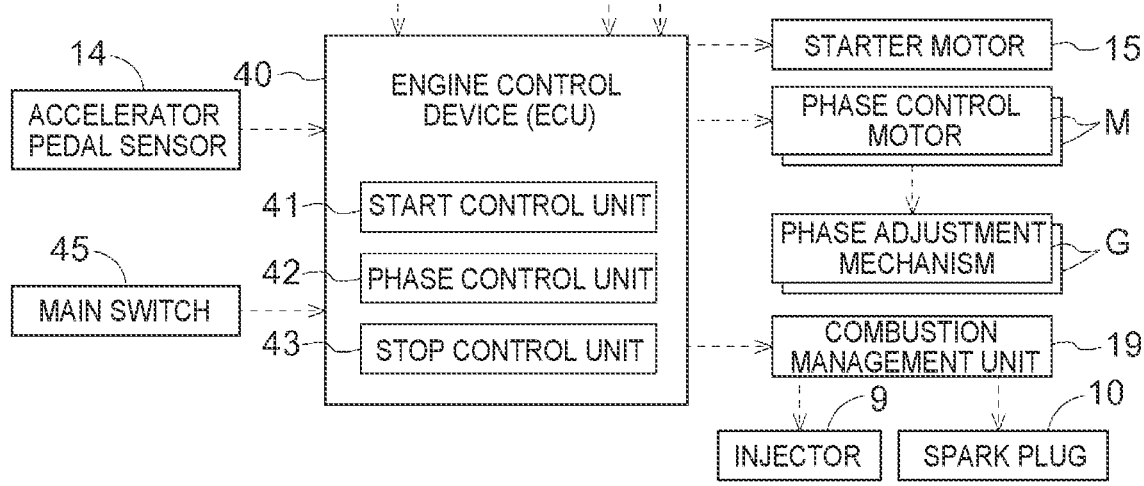

STOP CONTROL DEVICE FOR INTERNAL COMBUSTION ENGINE

TECHNICAL FIELD

The present disclosure relates to stop control devices for internal combustion engines.

BACKGROUND ART

Considering an engine as an example of an internal combustion engine, there are techniques described regarding an engine that is stopped with a crank angle being within a target crank angle range (e.g., Patent Document 1) and an engine whose piston is accurately stopped at a predetermined position to prevent self-ignition upon restarting (e.g., Patent Document 2).

Patent Document 1 describes a form of control in which a generator driven by an engine is provided, and when a request to stop the engine occurs, a target trajectory as a rotation behavior to be exhibited until the engine stops at a target stop crank angle is calculated, and the load of the generator is controlled so that an actual engine rotation behavior exhibited when performing engine rotation stop control matches the target trajectory.

Patent Document 2 describes a form of control in which an internal combustion engine includes an intake phase variable mechanism that can change the opening and closing timing of an intake valve, and a throttle valve, the throttle valve opening degree is controlled after the internal combustion engine is automatically stopped, and after this automatic stopping, the opening and closing timing of the intake valve is controlled toward an advancing side when the temperature in a cylinder is equal to or higher than a predetermined value and the opening and closing timing of the intake valve is earlier than when a piston reaches the bottom dead center.

Patent Document 2 also describes a form of control in which the throttle valve opening degree is controlled after the internal combustion engine is automatically stopped, and after this automatic stopping, the opening and closing timing of the intake valve is controlled toward a retarding side when the temperature in the cylinder is equal to or higher than the predetermined value and the opening and closing timing of the intake valve is later than when the piston reaches the bottom dead center.

RELATED ART DOCUMENTS

Patent Documents

Patent Document 1: Japanese Unexamined Patent Application Publication No. 2011-149379 (JP 2011-149379 A)
Patent Document 2: Japanese Unexamined Patent Application Publication No. 2011-174434 (JP 2011-174434 A)

SUMMARY

Problem to be Solved

For example, considering control in which an internal combustion engine is frequently stopped and started such as start-stop control, it is important to set the crank angle and the position of the piston when the internal combustion engine is stopped so that subsequent starting of the internal combustion engine can be performed satisfactorily.

Regarding this, it can be imagined that, after the internal combustion engine is stopped at the target stop crank angle by the control of Patent Document 1, the crank angle changes due to, for example, the action of the pressure of gas enclosed in the cylinder or the cam torque caused by the pressure acting between the cam surface of a cam shaft and the valve.

Even in the case where the position of the piston is controlled by the control of Patent Document 2, the opening and closing timing of the intake valve is not controlled and thus the compression ratio is not reduced when the temperature in the cylinder is less than the predetermined value. It can therefore be imagined that the position of the piston changes for a reason similar to that of Patent Document 1.

For this reason, a stop control device for an internal combustion engine is desired that stops an engine in a state suitable for starting and that does not cause the crank angle to change after the engine is stopped.

Means for Solving the Problem

A characteristic structure of a stop control device for an internal combustion engine according to the present disclosure is that a four-cycle internal combustion engine includes an electric valve opening and closing timing control device that sets an opening and closing timing of either or both of an intake valve and an exhaust valve, stop control of stopping the internal combustion engine is performed when a stop signal for stopping the internal combustion engine is acquired, and post-stop phase control of displacing the opening and closing timing of the valve opening and closing timing control device in either an advancing direction or a retarding direction is performed after the internal combustion engine is stopped by the stop control.

According to this characteristic structure, the post-stop phase control of displacing the opening and closing timing of the valve opening and closing timing control device in either the advancing direction or the retarding direction is performed after the internal combustion engine is stopped. Gas in a cylinder in a compressed state can thus be discharged, and a pressure acting on a piston can also be reduced. The weights of pistons and cam torques can also be balanced by performing the post-stop phase control. In particular, by performing the post-stop phase control, an external force acting on a crankshaft can be reduced after the internal combustion engine is stopped. Therefore, the stopped internal combustion engine can be smoothly restarted. The stop control device for an internal combustion engine is thus structured that stops the engine in a state suitable for starting and that does not cause a crank angle to change after the engine is stopped.

Pre-stop phase control of displacing the opening and closing timing of the valve opening and closing timing control device in a direction opposite to the direction in which the opening and closing timing is displaced in the post-stop phase control may be performed.

According to the above, in the case where the internal combustion engine is stopped by the stop control, a relative rotation phase of the valve opening and closing timing control device is displaced in, for example, the advancing direction by the pre-stop phase control. A compression ratio in the cylinder is thus increased, and a strong braking force is applied to the crankshaft by the gas pressure. The engine can thus be stopped in a short time. With the internal combustion engine thus stopped, the relative rotation phase of the valve opening and closing timing control device is displaced, for example, from the advancing direction to the retarding direction by the post-stop phase control. The gas in the cylinder in the compressed state can thus be discharged, and the pressure acting on the piston can be reduced. The weights of the pistons and the cam torques can also be balanced.

The valve opening and closing timing control device may set the opening and closing timing of the intake valve. The opening and closing timing of the valve opening and closing timing control device may be set to a most advanced angle by the pre-stop phase control, and the opening and closing timing of the valve opening and closing timing control device may be set to a most retarded angle by the post-stop phase control after the internal combustion engine is stopped.

According to the above, when stopping the internal combustion engine by the stop control, the relative rotation phase is set to the most advanced angle by the pre-stop phase control. The intake valve is thus closed early and the compression ratio in the cylinder is increased. A large load is thus applied to the crankshaft, so that the engine can be stopped quickly. Subsequently, after the internal combustion engine is stopped, the relative rotation phase is set to the most retarded angle by the post-stop phase control. Air in the cylinder with an increased pressure is thus discharged via the intake valve, transitioning to the state in which no pressure is applied to the crankshaft. The crank angle can thus be stabilized in a balanced manner.

The pre-stop phase control may be performed when a crank angle of a crankshaft reaches minus 180 degrees before the internal combustion engine is stopped, the crank angle when the internal combustion engine is stopped by the stop control being 0 degrees.

According to the above, the relative rotation phase is set to the most advanced angle by the pre-stop phase control when the crank angle reaches 180 degrees before the angle at which the internal combustion engine is stopped by the stop control (minus 180 degrees). The intake valve is thus closed early and the compression ratio in the cylinder is increased. A large load is thus applied to the crankshaft, so that the engine can be stopped quickly. Subsequently, after the internal combustion engine is stopped (the crank angle is 0 degrees), the relative rotation phase is set to the most retarded angle by the post-stop phase control. Air in the cylinder with an increased pressure is thus discharged via the intake valve, transitioning to the state in which no pressure is applied to the crankshaft. The crank angle can thus be stabilized in a balanced manner.

The valve opening and closing timing control device may set the opening and closing timing of the exhaust valve. The opening and closing timing of the valve opening and closing timing control device may be set to the most retarded angle by the pre-stop phase control before the internal combustion engine is stopped by the stop control, and the opening and closing timing of the valve opening and closing timing control device may be set to the most advanced angle by the post-stop phase control after the internal combustion engine is stopped.

According to the above, when stopping the internal combustion engine by the stop control, the relative rotation phase of the valve opening and closing timing control device is set to the most advanced angle by the pre-stop phase control. The exhaust valve is thus closed early, and a large load is applied to the crankshaft due to an increased compression ratio in the cylinder, so that the engine can be stopped quickly. Subsequently, after the internal combustion engine is stopped, the relative rotation phase of the valve opening and closing timing control device is set to the most retarded angle. Air in the cylinder with an increased compression ratio is thus discharged, transitioning to the state in which no pressure is applied to the crankshaft. The crank angle can thus be stabilized in a balanced manner.

The pre-stop phase control may be performed when the crank angle of the crankshaft reaches minus 180 degrees before the internal combustion engine is stopped, the crank angle when the internal combustion engine is stopped by the stop control being 0 degrees.

According to the above, the relative rotation phase is set to the most advanced angle by the pre-stop phase control when the crank angle reaches 180 degrees before the angle at which the engine is stopped by the stop control (minus 180 degrees). The exhaust valve is thus closed early, and a large load is applied to the crankshaft due to an increased compression ratio in the cylinder, so that the engine can be stopped quickly.

Subsequently, after the internal combustion engine is stopped (the crank angle is 0 degrees), the relative rotation phase is set to the most retarded angle by the post-stop phase control. Air in the cylinder with an increased compression ratio is thus discharged, transitioning to the state in which no pressure is applied to the crankshaft. The crank angle can thus be stabilized in a balanced manner.

The internal combustion engine may include a plurality of cylinders.

According to the above, when the internal combustion engine is stopped by the stop control, the internal combustion engine can be stopped with the weights of the pistons in the plurality of cylinders and the cam torques being balanced.

BRIEF DESCRIPTION OF THE DRAWINGS

FIG. 1 is a diagram showing a cross section of an engine and a control device.

DETAILED DESCRIPTION

Hereinafter, embodiments of the present disclosure will be described with reference to the drawings.

Basic Structure

As shown in FIG. 1, an engine E as an internal combustion engine includes an intake valve Va and an exhaust valve Vb, and also includes an electric first valve opening and closing timing control device A1 that sets the valve timing (opening and closing timing) of the intake valve Va, and an electric second valve opening and closing timing control device A2 that sets the valve timing (opening and closing timing) of the exhaust valve Vb. This engine E (example of the internal combustion engine) is illustrated as an engine mounted on a vehicle such as a passenger car.

The engine E is controlled by an engine control device 40. The first valve opening and closing timing control device A1 and the second valve opening and closing timing control device A2 have a common structure. The first valve opening and closing timing control device A1 and the second valve opening and closing timing control device A2 have hardware that determines the valve timing by the driving force of a phase control motor M (electric motor). Each phase control motor M is controlled by the engine control device 40. Hereinafter, the first valve opening and closing timing control device A1 and the second valve opening and closing timing control device A2 are sometimes referred to as "valve opening and closing timing control device A" as a generic concept thereof.

The engine control device 40 is an example of the stop control device for an internal combustion engine. When performing stop control of stopping the engine E by the engine control device 40, a stop control unit 43 controls either or both of the first valve opening and closing timing control device A1 and the second valve opening and closing timing control device A2.

Figure 2:
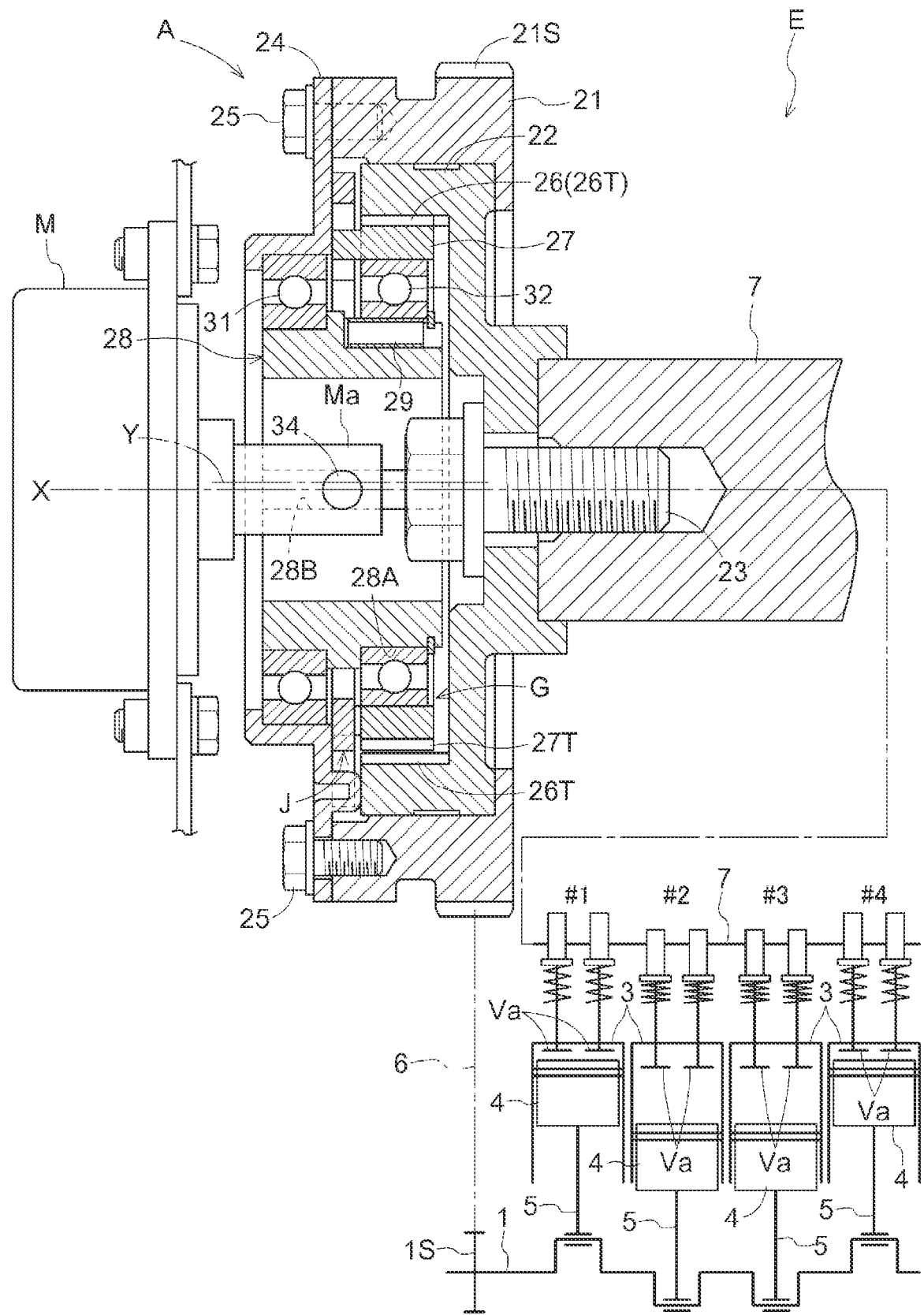
FIG. 2 is a cross-sectional view of a valve opening and closing timing control device.

As shown in FIG. 2, the valve opening and closing timing control device A has a drive case 21 (drive-side rotating body) and an internal rotor 22 (driven-side rotating body), and also has a phase adjustment mechanism G that changes the relative rotation phase between the drive case 21 and the internal rotor 22 (hereinafter sometimes simply referred to as "relative rotation phase") by the driving force of the phase control motor M.

The relative rotation phase between the drive case 21 and the internal rotor 22 is a relative angle between the drive case 21 and the internal rotor 22 about their rotation axis X.

As shown in FIG. 1, the engine E is structured as a four-cycle engine in which a cylinder head 3 is connected to the top of a cylinder block 2 supporting a crankshaft 1, pistons 4 are reciprocatingly housed in a plurality of cylinder bores formed in the cylinder block 2, and the pistons 4 are connected to the crankshaft 1 by connecting rods 5.

The intake valve Va and the exhaust valve Vb are mounted in the cylinder head 3, and an intake camshaft 7 that controls the intake valve Va and an exhaust camshaft 8 that controls the exhaust valve Vb are mounted on top of the cylinder head 3. A timing belt 6 is wound around an output pulley 1S of the crankshaft 1 and drive pulleys 21S of the two drive cases 21.

An injector 9 that injects fuel into a combustion chamber and a spark plug 10 are mounted in the cylinder head 3. An intake manifold 11 that supplies air into the combustion chamber via the intake valve Va and an exhaust manifold 12 that discharges burned gas from the combustion chamber via the exhaust valve Vb are connected to the cylinder head 3.

As shown in FIGS. 1 and 2, the engine E includes a starter motor 15 that drives and rotates the crankshaft 1, and also includes, at a position near the crankshaft 1, a crank angle sensor 16 that detects a crank angle. A first cam angle sensor 17 that detects a cam angle of the intake camshaft 7 is provided near the intake camshaft 7, and a second cam angle sensor 18 that detects a cam angle of the exhaust camshaft 8 is provided near the exhaust camshaft 8.

The engine control device 40 is structured as an ECU that controls the engine E, and includes a start control unit 41, a phase control unit 42, and the stop control unit 43 that are configured by software. Detection signals from the crank angle sensor 16, the first cam angle sensor 17, and the second cam angle sensor 18 are input to the engine control device 40. Signals from a main switch 45 and an accelerator pedal sensor 14 are also input to the engine control device 40.

The engine control device 40 also outputs control signals to the starter motor 15, the two phase control motors M, and a combustion management unit 19. The combustion management unit 19 controls the fuel injection amount and injection timing from the injector 9 and the ignition timing of the spark plug 10.

The start control unit 41, the phase control unit 42, and the stop control unit 43 are configured as software. However, a part of each of these units may be configured by hardware such as logic circuit or memory.

The main switch 45 is disposed on a panel portion in front of the driver's seat of the vehicle, and the start control unit 41 implements starting of the engine E by an operation of turning on the main switch 45. In a situation where the engine E is running, the phase control unit 42 implements valve timing control of the first valve opening and closing timing control device A1 and the second valve opening and closing timing control device A2. The stop control unit 43 implements control of stopping the engine E by an operation of turning off the main switch 45 (hereinafter referred to as "engine stop control").

As described above, the engine control device 40 functions as a stop control device for an internal combustion engine, and the stop control unit 43 that forms the engine control device 40 performs the control of stopping the engine E. The stop control unit 43 allows so-called start-stop control in which the engine E is automatically stopped when a condition for stopping the engine E is satisfied based on information including a signal from the accelerator pedal sensor 14 indicating that an accelerator pedal is released, and the engine E is automatically started when a condition for starting the engine E such as that the accelerator pedal is depressed is subsequently satisfied.

Particularly in this start-stop control, the engine E is quickly stopped by the engine stop control, and when the engine E is stopped, the crank angle of the crankshaft 1 is stabilized, and the state of the crankshaft 1 is set so as to increase subsequent startability of the engine E. This engine stop control will be described in detail later.

Sensor

Each of the crank angle sensor 16, the first cam angle sensor 17, and the second cam angle sensor 18 is structured as a pickup sensor that outputs a pulse signal according to rotation. As the crankshaft 1 rotates, the crank angle sensor 16 outputs successive pulse signals as crank angle signals using a preset crank angle as a reference (reference angle).

Therefore, a crank angle from the set reference angle can be detected by counting the crank angle signals.

The first cam angle sensor 17 and the second cam angle sensor 18 are structured to output a single pulse signal as a cam angle signal every time a preset cam angle is reached. The camshaft (generic concept of the intake camshaft 7 and the exhaust camshaft 8) is structured to output a cam angle signal (generic concept of signals detected by the first cam angle sensor 17 and the second cam angle sensor 18) a plurality of times at different intervals as the camshaft makes one rotation at a constant speed. Therefore, a cam angle at the timing when a cam angle signal is detected can be detected by determining the interval of the cam angle signals based on the above crank angle signals.

For this reason, by storing a crank angle and a cam angle in the state where the drive case 21 and the internal rotor 22 are in a predetermined reference phase (e.g., intermediate phase), the relative rotation phase can be detected by performing an operation of comparing a count value of crank angle signals and a count value of cam angle signals, even when the relative rotation phase is displaced from the reference phase in either the advancing direction or the retarding direction. That is, the relative rotation phases of the first valve opening and closing timing control device A1 and the second valve opening and closing timing control device A2 can be individually detected by using the crank angle sensor 16, the first cam angle sensor 17, and the second cam angle sensor 18.

Valve Opening and Closing Timing Control Device

The first valve opening and closing timing control device A1 and the second valve opening and closing timing control device A2 have a common structure. FIG. 2 shows a cross section of the first valve opening and closing timing control device A1 as a specific example of the valve opening and closing timing control device A.

As shown in the figure, the valve opening and closing timing control device A has the drive case 21 (drive-side rotating body) and the internal rotor 22 (driven-side rotating body) that are disposed coaxially with the rotation axis X of the intake camshaft 7, and includes the phase adjustment mechanism G that sets the relative rotation phase therebetween by the driving force of the phase control motor M.

The drive pulley 21S is formed on the outer periphery of the drive case 21. The internal rotor 22 is enclosed in the drive case 21, and is connected and fixed to the intake camshaft 7 by a connecting bolt 23. With this structure, the internal rotor 22 is connected to and supported by the intake camshaft 7, and the drive case 21 is relatively rotatably supported on the outer peripheral portion of the internal rotor 22.

The phase adjustment mechanism G is disposed between the drive case 21 and the internal rotor 22, and a front plate 24 is fastened by a plurality of fastening bolts 25 at such a position that the front plate 24 covers an opening portion of the drive case 21. Displacement between the phase adjustment mechanism G and the internal rotor 22 in a direction along the rotation axis X is restricted by the front plate 24.

Valve Opening and Closing Timing Control Device: Phase Adjustment Mechanism

As shown in FIG. 2, the phase adjustment mechanism G includes: a ring gear 26 formed coaxially with the rotation axis X on the inner periphery of the internal rotor 22; an inner gear 27 rotatably disposed radially inside the internal rotor 22 coaxially with an offset axis Y having an attitude parallel to the rotation axis X; an eccentric cam body 28 located radially inside the inner gear 27; the front plate 24; and a joint portion J. The offset axis Y has an attitude parallel to the rotation axis X.

The ring gear 26 has a plurality of internal teeth 26T, and the inner gear 27 has a plurality of external teeth 27T. A part of the external teeth 27T meshes with the internal teeth 26T of the ring gear 26. This phase adjustment mechanism G is structured as an internal planetary gear reducer in which the number of external teeth 27T of the inner gear 27 is one fewer than the number of internal teeth 26T of the ring gear 26.

The joint portion J is structured as an Oldham's joint that rotates the inner gear 27 and the drive case 21 together while maintaining such a positional relationship that the inner gear 27 is eccentric with respect to the drive case 21.

The eccentric cam body 28 has a cylindrical overall shape, and has in its inner periphery a pair of engagement grooves 28B having an attitude parallel to the rotation axis X. The eccentric cam body 28 is supported on the front plate 24 via a first bearing 31 so as to rotate coaxially with the rotation axis X, and has an eccentric cam surface 28A on a part of its outer periphery located on the intake cam shaft 7 side with respect to this support position.

The eccentric cam surface 28A is formed in a circular shape (circular in cross section) about the offset axis Y having an attitude parallel to the rotation axis X. The inner gear 27 is rotatably supported on the eccentric cam surface 28A via a second bearing 32. A spring 29 is fitted in a recess formed in the eccentric cam surface 28A, so that the biasing force of the spring 29 is applied to the inner gear 27 via the second bearing 32. With such a structure, a part of the external teeth 27T of the inner gear 27 meshes with a part of the internal teeth 26T of the ring gear 26, and this meshing state is maintained by the biasing force of the spring 29.

The phase control motor M is supported by the engine E, and an engagement pin 34 formed on an output shaft Ma is fitted in the engagement grooves 28B in the inner periphery of the eccentric cam body 28. Although details are not shown, the phase control motor M includes: a rotor having permanent magnets; a stator having a plurality of field coils arranged at such positions that the field coils surround the rotor; the output shaft Ma (shaft) to which rotation of the rotor is transmitted; and a rotation detection unit having three Hall elements for detecting magnetism of the permanent magnets of the rotor. The phase control motor M is thus structured as a brushless motor with a structure common to three-phase motors.

In the valve opening and closing timing control device A, when the engine E is running, the relative rotation phase of the valve opening and closing timing control device A is maintained by driving and rotating the output shaft Ma in the a driving rotation direction S (see FIG. 1) at a speed equal to that of the crankshaft 1. Control of reducing the rotational speed of the output shaft Ma is performed when displacing the relative rotation phase in an advancing direction Sa (see FIG. 1), and control of increasing the rotational speed of the output shaft Ma is performed when displacing the relative rotation phase in a retarding direction Sb (see FIG. 1).

That is, in a situation where the engine E is stopped, when the eccentric cam body 28 is rotated about the rotation axis X as the output shaft Ma is rotated as driven by the phase control motor M, the phase adjustment mechanism G rotates the inner gear 27 and the ring gear 26 relative to each other by an angle corresponding to the difference in number of teeth therebetween every time the inner gear 27 makes one rotation. As a result, the drive case 21 that rotates together with the inner gear 27 via the joint portion J and the intake camshaft 7 connected to the ring gear 26 by the connecting bolt 23 are rotated relative to each other to implement adjustment of the valve timing.

As shown in FIG. 1, both the entire first valve opening and closing timing control device A1 and the entire second valve opening and closing timing control device A2 are rotated in the driving rotation direction S by the driving force from the timing belt 6. As the driving force of the phase control motor M is transmitted to the internal rotor 22 via the phase adjustment mechanism G, the relative rotational phase of the internal rotor 22 with respect to the drive case 21 is displaced. Regarding this displacement, the displacement direction that is the same as the driving rotation direction S is referred to as the advancing direction Sa, and the opposite direction to this direction is referred to as the retarding direction Sb. Particularly, the limit phase in the advancing direction Sa is referred to as the most advanced angle, and the limit phase in the retarding direction Sb is referred to as the most retarded angle.

Engine Stop Control

As described above, in the start-stop control, the stop control unit 43 implements control in which, in the start-stop control, the engine E is quickly stopped, and immediately after the engine E is stopped, the forces acting on the crankshaft 1 are balanced to allow slight rotation of the crank shaft 1 and stabilize the crank angle. Since the crank angle is stabilized in this way, the cranking load during starting of the engine E is reduced, and improvement in startability is achieved.

In the engine stop control by the stop control unit 43, the engine stop control can be performed by only the valve timing control of either the first valve opening and closing timing control device A1 or the second valve opening and closing timing control device A2. Therefore, two types of engine stop control will be individually described below.

Valve Timing Control for Intake Valve During Engine Stop Control

Figure 3:
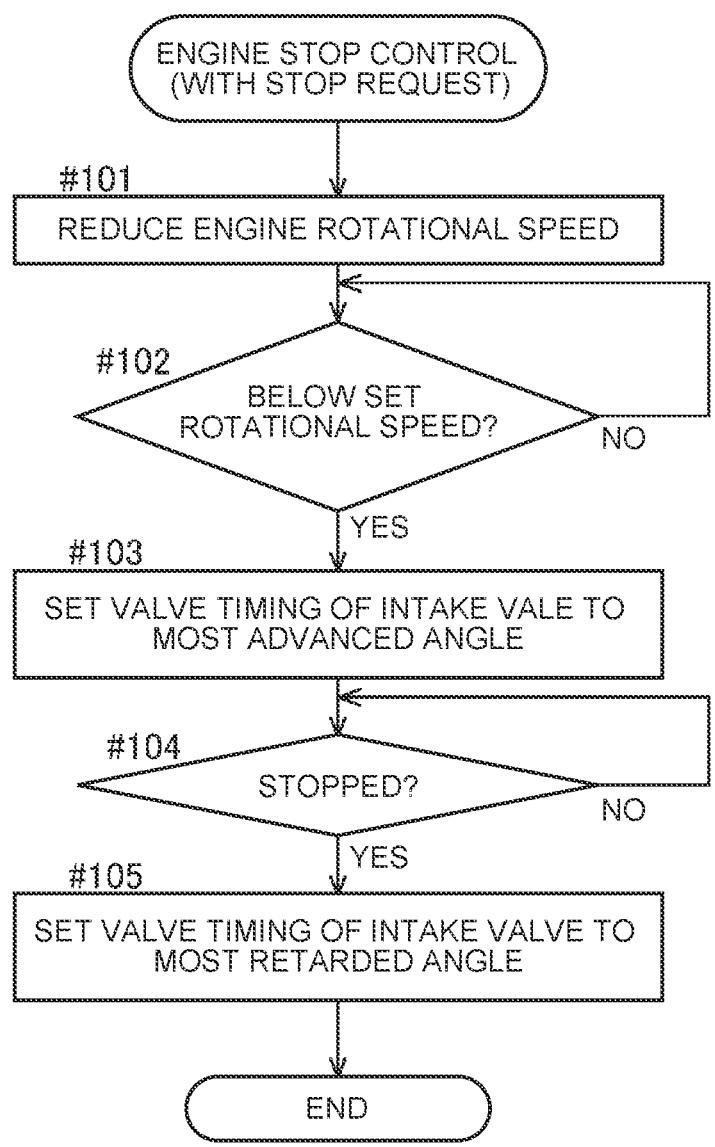
FIG. 3 is a flowchart of engine stop control.
Figure 4:
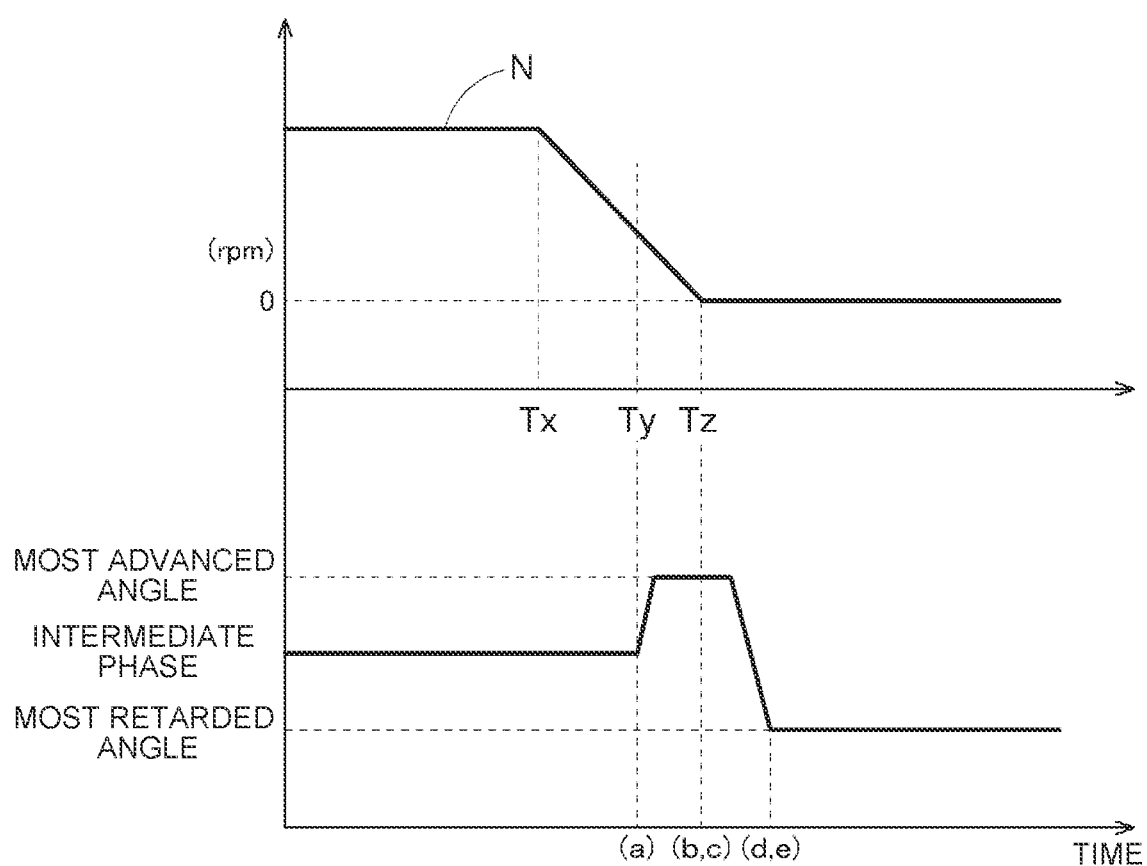
FIG. 4 is a timing chart of the engine rotational speed and the valve timing.

The flowchart of FIG. 3 shows a form of control of the valve timing of the intake valve Va in the engine stop control. FIG. 4 shows the relationship between the rotational speed of the engine E (to be exact, the rotational speed of the crankshaft 1: hereinafter simply referred to as the rotational speed) and the valve timing (relative rotation phase) in a timing chart.

Figure 5:
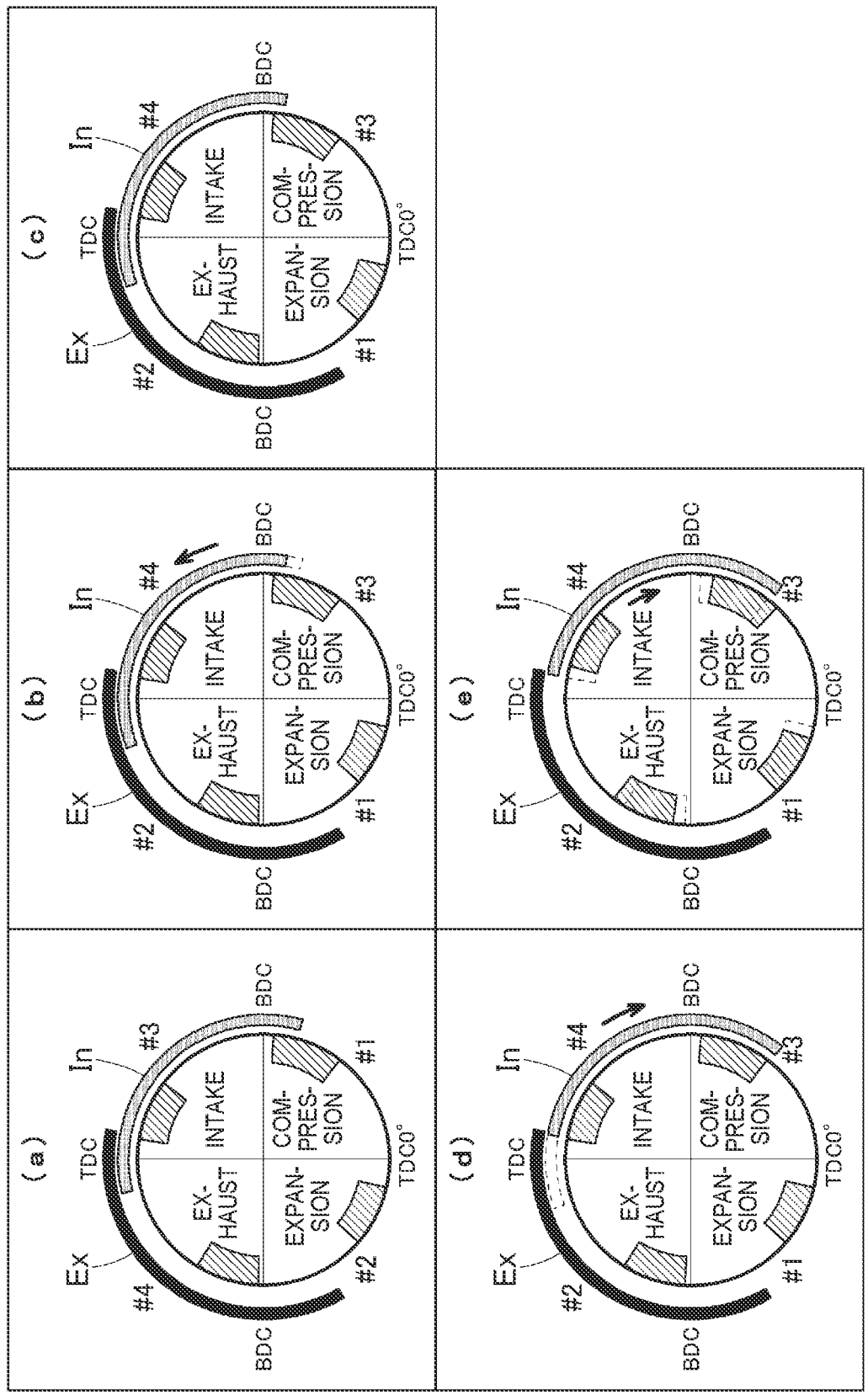
FIG. 5 shows diagrams illustrating the relationship between an intake valve and an exhaust valve.
Figure 6:
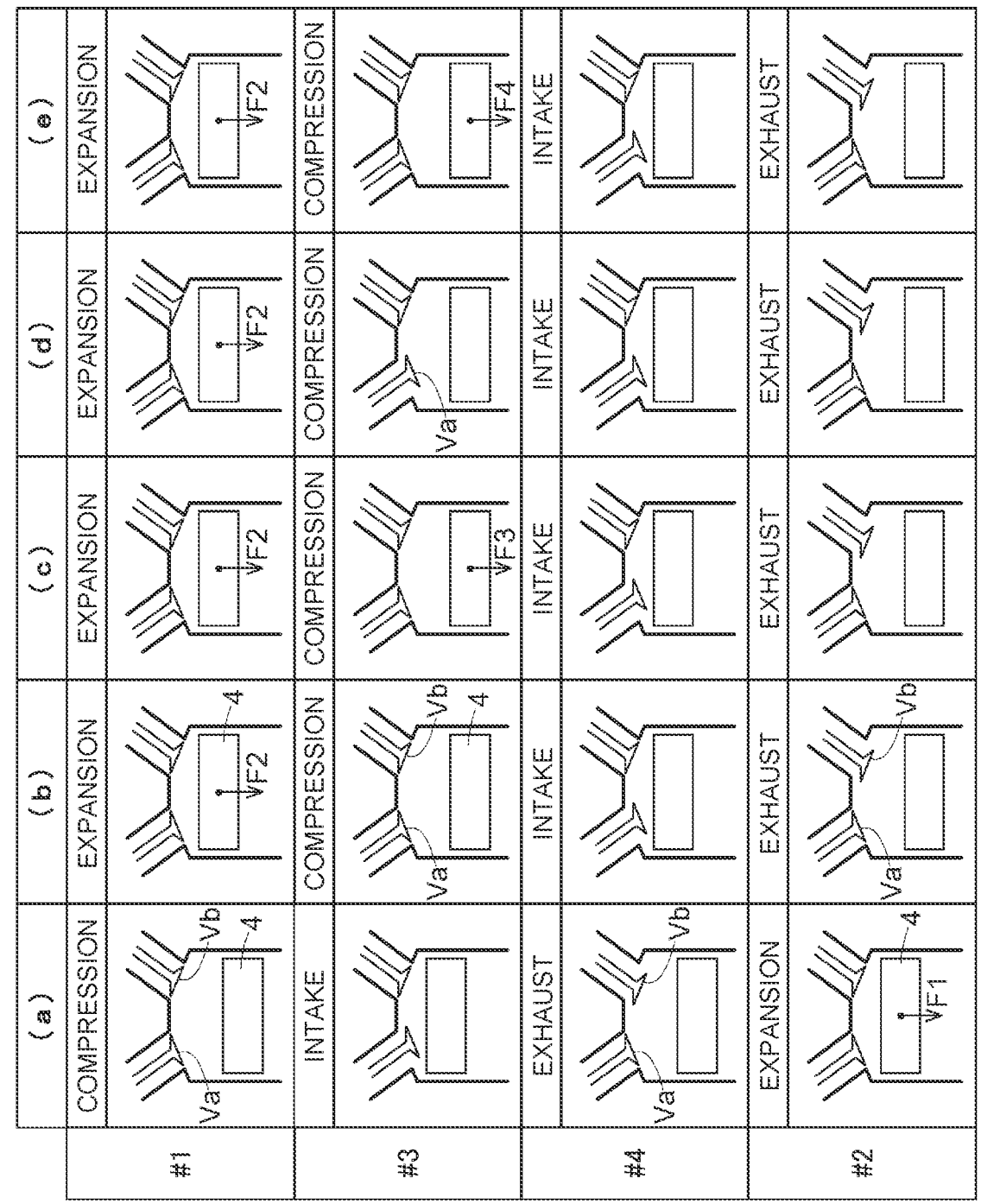
FIG. 6 is a diagram illustrating the relationship among the intake valve, the exhaust valve, and a piston in the strokes of each cylinder.

FIG. 5 shows, in diagrams, the strokes in each cylinder denoted by #1 to #4 in FIG. 2 and the relationship between the intake valve Va and the exhaust valve Vb. FIG. 6 shows this relationship in a stroke diagram in the form of a chart. In the diagrams of FIG. 5 and the stroke diagram of FIG. 6, the states at the same timings during passage of time are denoted by signs (a) to (e). Signs #1 to #4 identify cylinder #1, cylinder #2, cylinder #3, and cylinder #4 of the engine E shown in FIG. 2. In these cylinders, combustion is performed in the order of cylinder #1, cylinder #3, cylinder #4, and cylinder #2, as shown in the stroke diagram.

In the diagrams of FIG. 5, the region in which the crankshaft 1 makes two rotations (720 degrees) is represented as one circle, the cylinders are shown by signs #1 to #4, and the strokes are labeled by intake, compression, expansion, and exhaust. In the figure, the region in which the intake valve Va is open is denoted by sign In, and the region in which the exhaust valve Vb is open is denoted by sign Ex. In the figure, TDC refers to top dead center, and BDC is bottom dead center.

That is, in this engine stop control, when there is a stop request to stop the engine E at a request timing Tx shown in FIG. 4, the rotational speed N of the engine E is reduced by reducing the fuel supply amount (steps #101, #102), and the valve timing of the intake valve Va is set to the most advanced angle at a setting timing Ty at which the rotational speed N of the engine E falls below (becomes less than) a set rotational speed (step #103: (a) in FIG. 5). This step #103 is a specific example of the pre-stop phase control.

As can be understood from FIGS. 5 and 6, at the setting timing Ty, cylinder #1 is in the compression stroke, and as shown in the timing (a), the valve timing of the intake valve Va is set to the most advanced angle by the control of the first valve opening and closing timing control device A1. Therefore, the intake valve Va is closed when the piston 4 of cylinder #1 is in the early stage of the compression stroke. The amount of gas discharged from the intake valve Va to the intake side thus decreases and the compression ratio in cylinder #1 increases. At this time, cylinder #2 is in the expansion stroke at the timing (a) shown in FIGS. 5 and 6, and a force F1 acts on the piston 4.

In any cylinder, when the cylinder transitions from the intake stroke to the compression stroke, the intake valve Va is open from immediately before the piston 4 reaches the bottom dead center BDC to the initial stage of the compression stroke in which the piston 4 starts to rise. Therefore, the valve timing of the intake valve Va is set to the most advanced angle in the initial stage of the compression stroke so that the intake valve Va is closed early after the piston 4 reaches the bottom dead center BDC. This reduces the phenomenon that a part of the gas in cylinder #1 is discharged to the intake side in the early stage of the compression stroke, and thus achieves an increase in compression ratio.

When cylinder #1 subsequently transitions to the expansion stroke as shown in the timing (b), the expansion stroke is performed in cylinder #1 with the increased compression ratio. Therefore, a force F2 acts on the piston 4 due to the pressure of burned gas. At this time, cylinder #3 transitions to the compression stroke. However, since the intake valve Va is closed early as in cylinder #1, a force F3 acts on the piston 4 of cylinder #3 at the timing (c) shown in FIG. 6. At this timing (c), the force F2 is acting on cylinder #1 as described above. Since the force F2 and the force F3 act in the same direction and the load increases, the engine E stops at a stop timing Tz.

When the crank angle at the timing (c) when the engine E stops is 0 degrees, the timing (a) when the valve timing of the intake valve Va is set to the most advanced angle is minus 180 degrees. In the engine stop control, the cylinder in which the intake valve Va is closed early in the initial stage of the compression stroke is not limited to cylinder #1, and may be other cylinder. In this case, the engine E is stopped by the action with the pressure in the cylinder in the intake stroke.

Thereafter, as shown in FIG. 3, after it is confirmed by a signal from the crank angle sensor 16 that the engine E is stopped (Yes in step #104), the valve timing of the intake valve Va is set to the most retarded angle by the control of the first valve opening and closing timing control device A1 (step #105: (d), (e) in FIG. 5). The control in this step #105 is a specific example of the post-stop phase control.

As shown in the timing (d), by setting the valve timing of the intake valve Va to the most regarded angle after the engine E is stopped, the intake valve Va of cylinder #3 that has already been in the compression stroke is opened (see the timing (d) of #3 in FIG. 6), and the gas in cylinder #3 is discharged via this intake valve Va. As a result, the pressure in cylinder #3 decreases with respect to the pressure in cylinder #1. Since the pressure in cylinder #3 decreases, the force F3 acting on the piston 4 of cylinder #3 at the timing (c) decreases to a force F4 as shown in the timing (e). As a result, the crankshaft 1 is rotated slightly in the direction in which the pressure (force F2) in cylinder #1 and the pressure (F4) in cylinder #3 are balanced (direction in which the piston 4 of cylinder #1 moves downward). The balanced state shown in the timing (e) is thus reached, and the rotation of the crankshaft 1 stops completely.

In this balanced state, not only the pressure in cylinder #1 and the pressure in cylinder #3 are balanced, but also the weights of cylinder #4 and cylinder #2 are balanced, and the cam torques acting from the cam surface of the intake camshaft 7 and the cam surface of the exhaust camshaft 8 are also balanced.

Valve Timing Control for Exhaust Valve During Engine Stop Control

Figure 7:
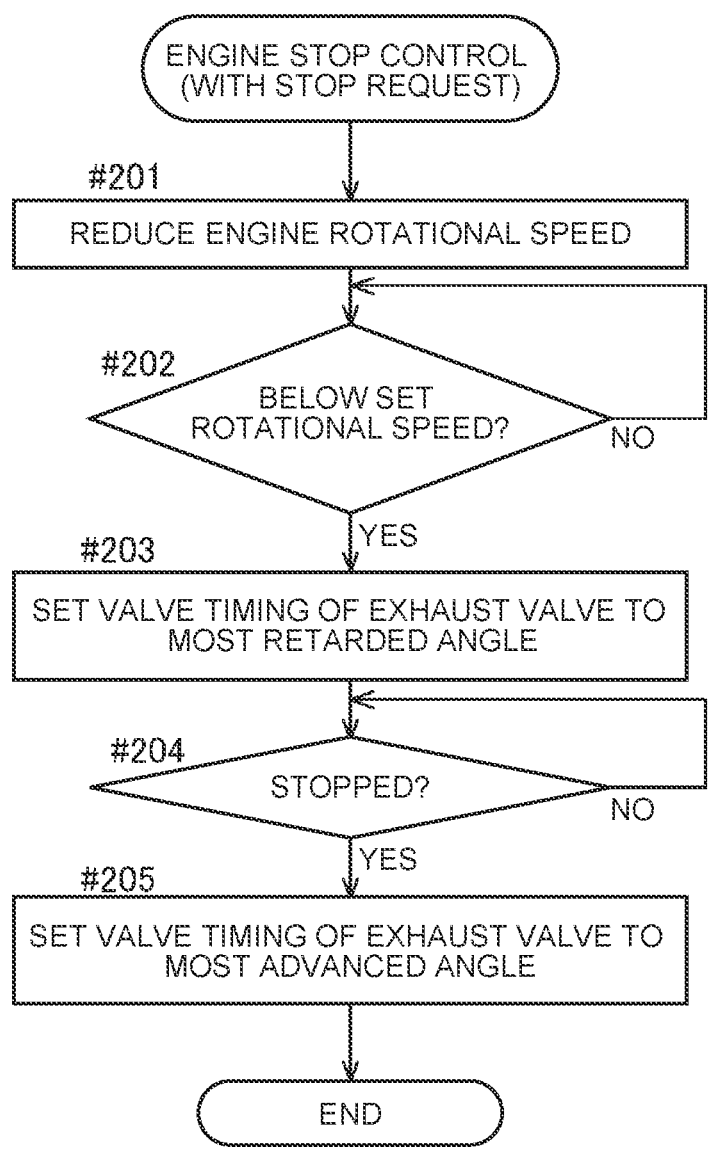
FIG. 7 is a flowchart of engine stop control.
Figure 8:
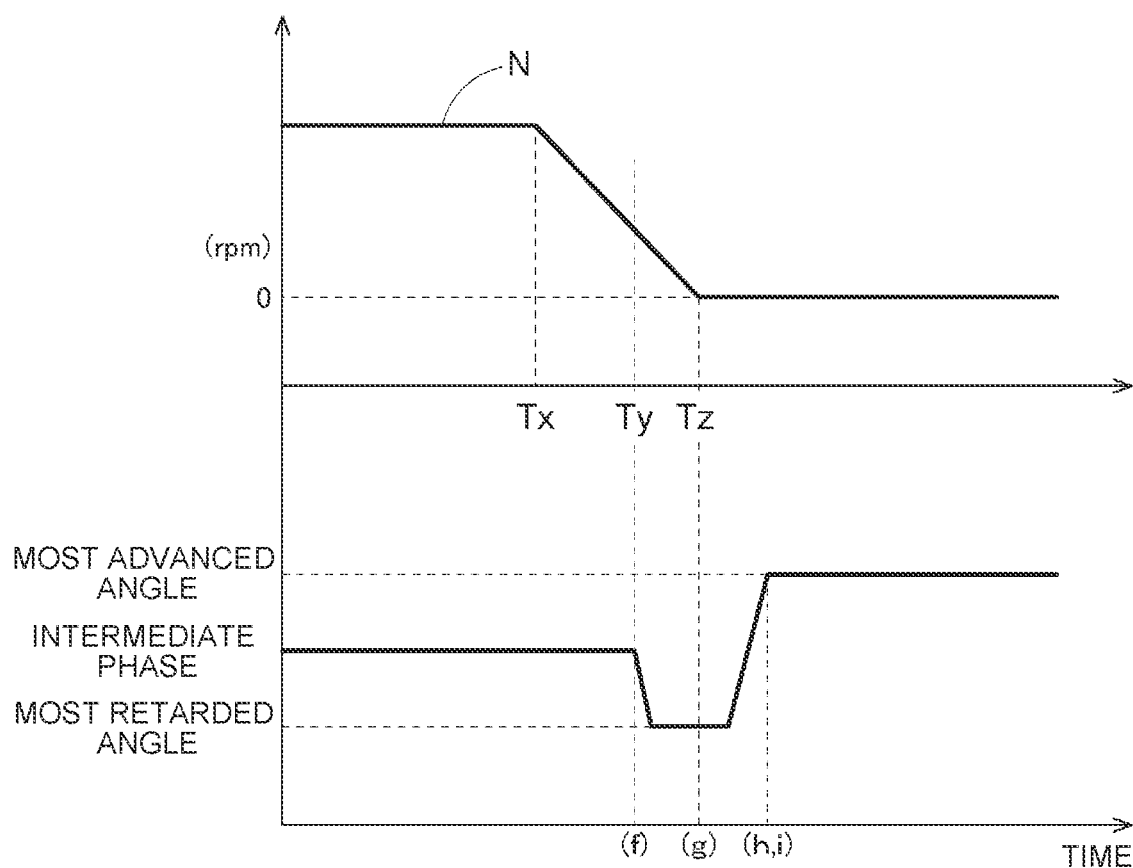
FIG. 8 is a timing chart of the engine rotational speed and the valve timing.

The flowchart of FIG. 7 shows a form of control of the valve timing of the exhaust valve Vb in the engine stop control. FIG. 8 shows the relationship between the rotational speed N of the engine E and the valve timing (relative rotation phase) of the exhaust valve Vb in a timing chart.

Figure 9:
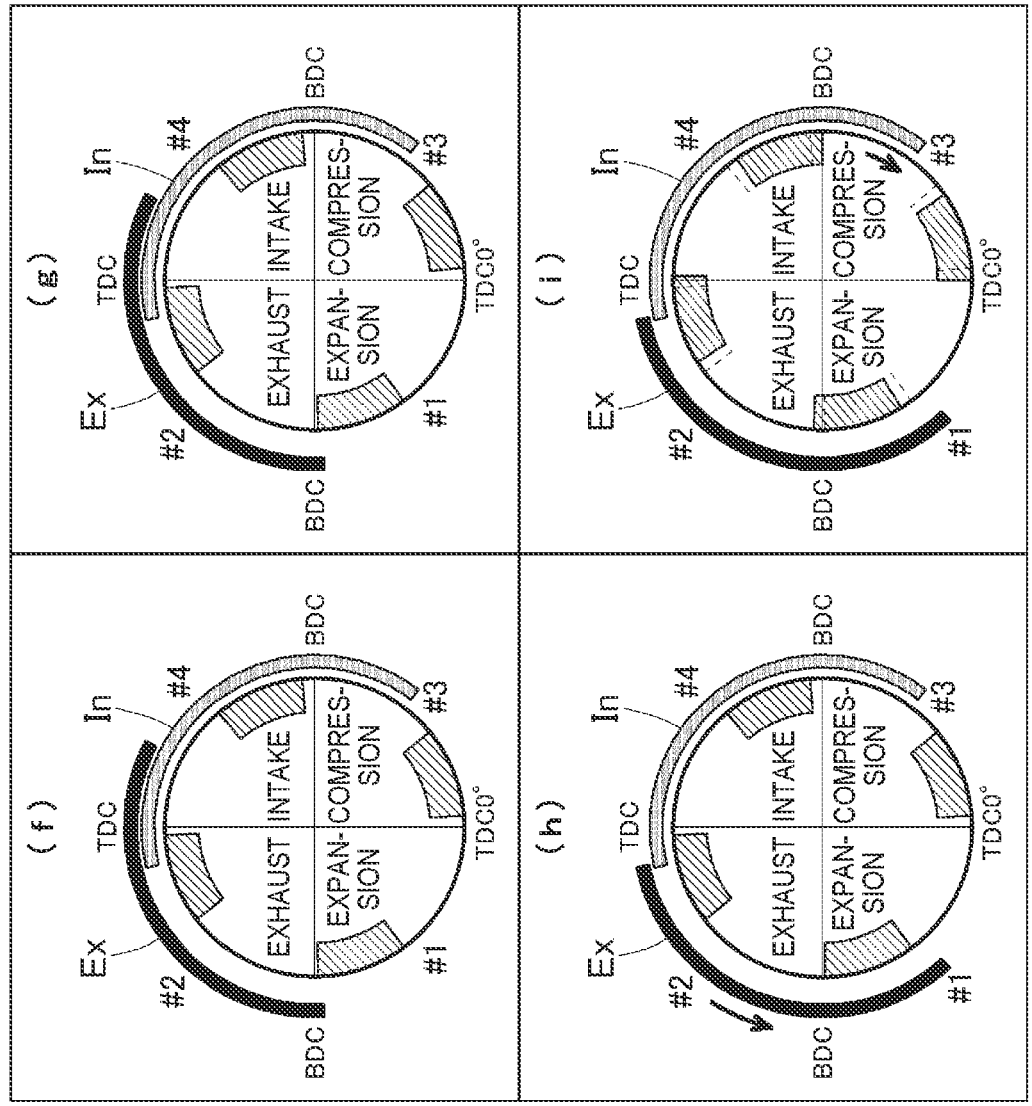
FIG. 9 shows diagrams illustrating the relationship between the intake valve and the exhaust valve.
Figure 10:
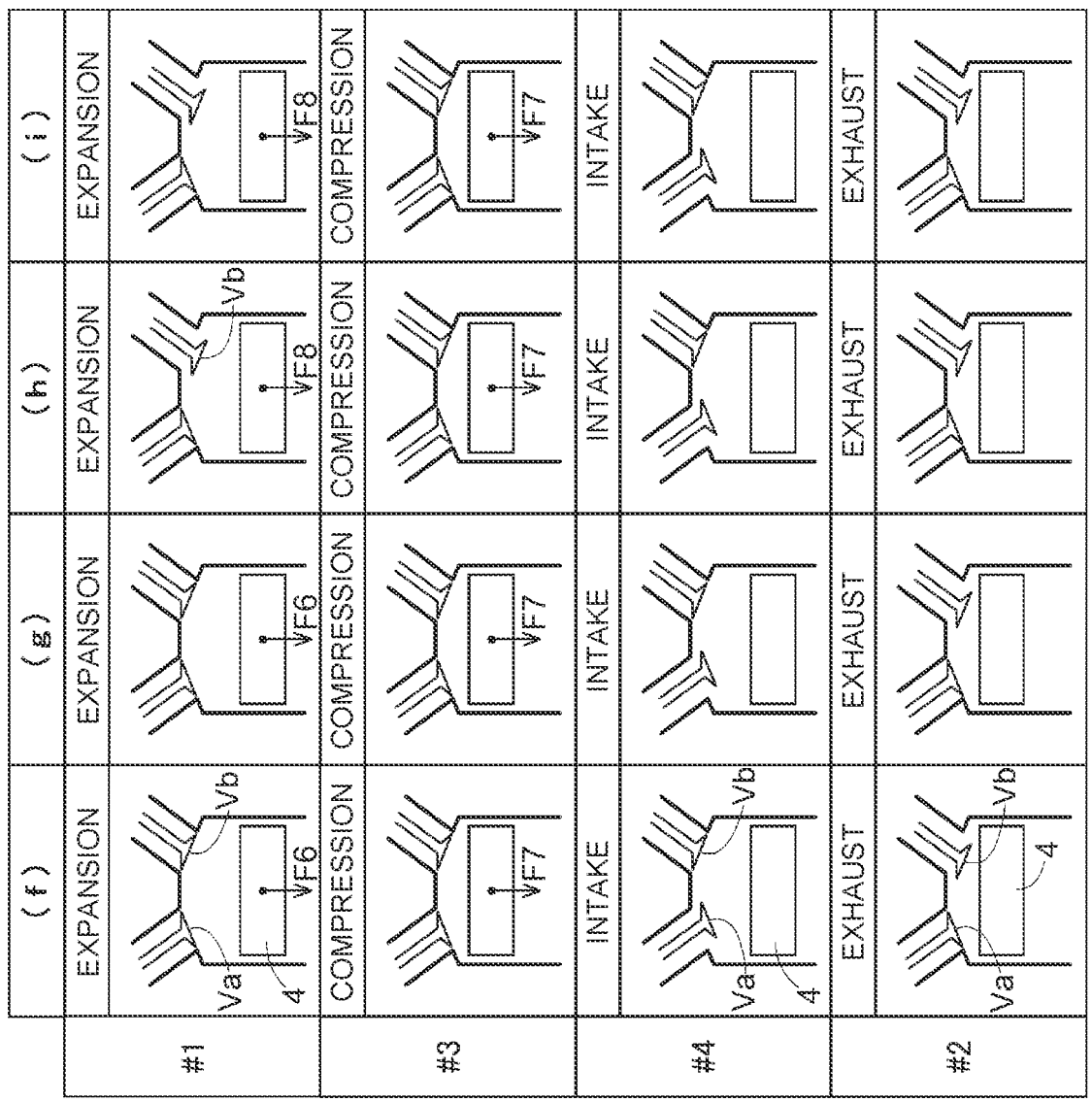
FIG. 10 is a diagram illustrating the relationship among the intake valve, the exhaust valve, and the piston in the strokes of each cylinder.

FIG. 9 shows diagrams of the relationship between the stroke in each cylinder denoted by #1 to #4 in FIG. 2 and the intake valve Va and the exhaust valve Vb. FIG. 10 shows this relationship in a stroke diagram in the form of a chart. In the diagrams of FIG. 9 and the stroke diagram of FIG. 10, the states at the same timings along the axis of time are denoted by signs (f) to (i). Signs #1 to #4 identify cylinder #1, cylinder #2, cylinder #3, and cylinder #4 of the engine E shown in FIG. 2. In these cylinders, combustion is performed in the order of cylinder #1, cylinder #3, cylinder #4, and cylinder #2, as shown in the stroke diagram.

In the diagrams of FIG. 9, as described above regarding the intake valve Va, the region in which the crankshaft 1 makes two rotations (720 degrees) is represented as one circle, the cylinders are shown by signs #1 to #4, and the strokes are labeled by intake, compression, expansion, and exhaust. In the figure, the region in which the intake valve Va is open is denoted by sign In, and the region in which the exhaust valve Vb is open is denoted by sign Ex. In the figure, TDC refers to top dead center, and BDC is bottom dead center.

That is, in this engine stop control, when a stop signal for stopping the engine E is received at a request timing Tx shown in FIG. 8, the rotational speed N of the engine E is reduced by reducing the fuel supply amount (steps #201, #202), and the valve timing of the exhaust valve Vb is set to the most retarded angle at a setting timing Ty at which the rotational speed N of the engine E falls below (becomes less than) a set rotational speed (step #203: (f) in FIG. 9). This step #203 is a specific example of the pre-stop phase control.

As can be understood from FIGS. 9 and 10, at the setting timing Ty, cylinder #1 is in the expansion stroke, and as shown in the timing (f), the valve timing of the exhaust valve Vb is set to the most retarded angle by the control of the second valve opening and closing timing control device A2. Therefore, the exhaust valve Vb is closed when the piston 4 of cylinder #1 is near the end of the expansion stroke (immediately before the bottom dead center BDC). Gas is thus confined in cylinder #1 where gas is discharged from the exhaust valve Vb to the exhaust side.

As described above, cylinder #1 is in the expansion stroke at the timing (f) shown in FIG. 10, and a force F6 acts on the piston 4. Cylinder #3 is in the compression stroke at this timing (f), and a force F7 acts on the piston 4 of cylinder #3. At this timing (f), the piston 4 in cylinder #1 is near the bottom dead center BDC, while the piston 4 in cylinder #3 is near the top dead center TDC. Therefore, the force F7 is larger than the force F6, and the crankshaft 1 rotates slightly in a reverse direction due to the balance of the forces.

In any cylinder, when the cylinder transitions from the expansion stroke to the exhaust stroke, the exhaust valve Vb is open from immediately before the piston 4 reaches the bottom dead center BDC to the initial stage of the exhaust stroke in which the piston 4 starts to rise. Therefore, the valve timing of the exhaust valve Vb is set to the most retarded angle before the expansion stroke ends, so that the exhaust valve Vb is closed early. This reduces the phenomenon that a part of the gas (burned gas) in cylinder #1 in the expansion stroke is discharged to the exhaust side, and thus achieves an increase in compression ratio.

The gas (burned gas) is thus enclosed in cylinder #1. Therefore, as shown in the timing (g), the load increases due to the pressure (F6) in cylinder #1 and the pressure (F7) in cylinder #3 in which gas has already been compressed. As a result, at a stop timing Tz, the engine E stops with the crankshaft 1 rotating slightly in the reverse direction as described above.

In the engine stop control, the cylinder in which the exhaust valve Vb is closed early near the end of the expansion stroke is not limited to cylinder #1, and may be other cylinder. In this case, the engine E is stopped by the action with the pressure in the cylinder in the compression stroke.

Thereafter, as shown in FIG. 7, after it is confirmed by a signal from the crank angle sensor 16 that the engine E is stopped (Yes in step #204), the valve timing of the exhaust valve Vb is set to the most advanced angle by the control of the second valve opening and closing timing control device A2 (step #205: (h), (i) in FIG. 9). The control in this step #205 is a specific example of the post-stop phase control.

As shown in the timing (h), by setting the valve timing of the exhaust valve Vb to the most advanced angle after the engine E is stopped, the exhaust valve Vb of cylinder #1 is opened (see the timing (h) of #1 in FIG. 10), and the gas in cylinder #1 is discharged via this exhaust valve Vb, so that a force F8 acting on the piston 4 of cylinder #1 becomes smaller than the force F7 described above.

As the pressure (F8) in cylinder #1 thus becomes smaller than the pressure (F7) in cylinder #3, the crankshaft 1 rotates slightly in a direction in which these pressures are balanced. The balanced state shown in the timing (i) is thus reached, and the rotation of the crankshaft 1 stops completely.

In this balanced state, not only the pressure in cylinder #1 and the pressure in cylinder #3 are balanced, but also the weights of cylinder #4 and cylinder #2 are balanced, and the cam torques acting from the cam surface of the intake camshaft 7 and the cam surface of the exhaust camshaft 8 are also balanced.

Functions and Effects of Embodiment

As described above, when there is a stop request to stop the engine E (a stop signal is acquired), the engine E can be quickly stopped using the pressures of gas enclosed in the plurality of cylinders by merely controlling the valve timing by the valve opening and closing timing control device A in the engine stop control. After the engine E is stopped, the valve timing is further controlled by the valve opening and closing timing control device A to discharge gas in the cylinder. The engine E can thus be stopped with a reduced force acting on the crankshaft 1 due to the pressure of the cylinder. As described above, when the engine E is stopped, the stop position of the crankshaft 1 is determined with not only the pressures in the cylinders but also the weights of the plurality of pistons 4 and the cam torques of the intake camshaft 7 and the exhaust camshaft 8 being balanced. That is, in the engine stop control, the pre-stop phase control of stopping the valve timing is performed when there is a stop request to stop the engine E (a stop signal is acquired). The engine E is thus stopped. Thereafter, the post-stop phase control is performed. The crankshaft 1 is thus rotated slightly, and the engine E is stopped completely in a balanced state.

When the engine stop control is performed for the start-stop control, the engine E is stopped quickly, and therefore fuel consumption is reduced. When starting the engine E subsequently, the starter motor 15 can be driven and rotated with the load on the crankshaft 1 reduced. Therefore, the crankshaft 1 can be rotated at high speed in a short time, and the starting time can be reduced.

In particular, in the case where the valve timing of the intake valve Va is controlled during the engine stop control, the valve timing of the intake valve Va is kept at the most retarded angle with the engine E stopped. This allows cranking in a decompressed state when starting the engine E. The load during starting can thus further be reduced, and the crankshaft 1 can be rotated at high speed in a short time. The engine E can therefore be started quickly.

Another Embodiment

The present disclosure may be structured as follows in addition to the above embodiment (portions having the same functions as those of the above embodiment are denoted by same numerals and signs as those of the above embodiment).

(a) The present disclosure is structured so that the valve timing control of both the first valve opening and closing timing control device A1 and the second valve opening and closing timing control device A2 is performed in the engine stop control.

Figure 11:
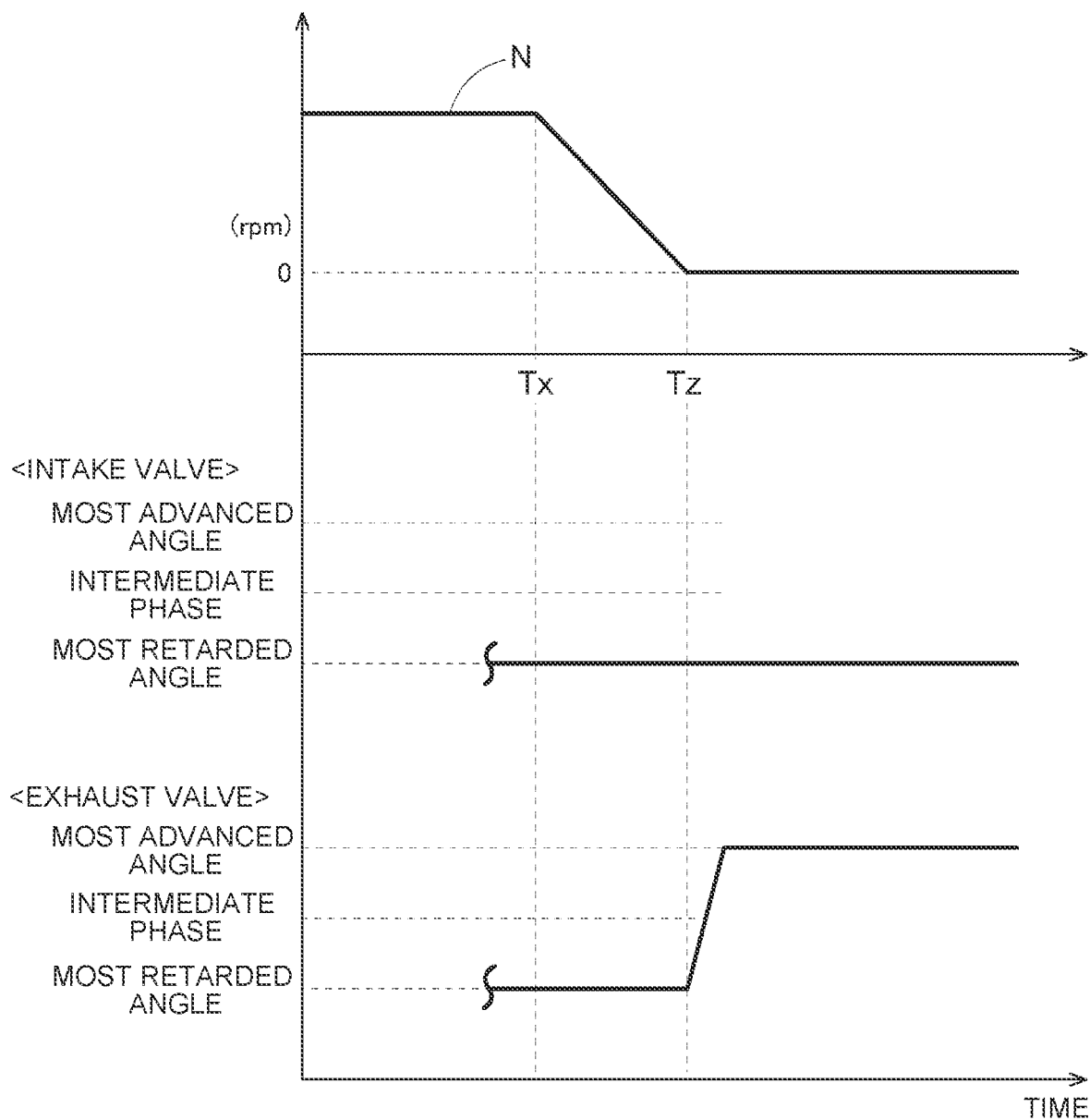
FIG. 11 is a timing chart of another embodiment (a).

As an example of this form of control, as shown in the timing chart of FIG. 11, when a stop signal to stop the engine E is received at a request timing Tx, the rotational speed N of the engine E is reduced by reducing the fuel supply amount. Control of setting the valve timing of the intake valve Va to the most retarded angle and setting the valve timing of the exhaust valve Vb to the most retarded angle is performed when reducing the rotational speed N of the engine E.

As a result, as the rotational speed N of the engine E decreases, the engine E stops at a stop timing Tz due to the pressures in cylinder #1 and cylinder #3 as described above in the timings (f), (g) of FIG. 9. By performing control of setting the valve timing of the exhaust valve Vb to the most advanced angle after the engine E is thus stopped, the exhaust valve Vb in cylinder #1 is opened, and the crankshaft 1 reversely rotates slightly in a direction in which the pressures are balanced, so that the balanced state is reached, and the rotation of the crankshaft 1 stops completely, as described above regarding the timings (h), (i) in FIG. 9.

In the another embodiment (a), when performing the engine stop control, the valve timing of the intake valve Va is set to the most retarded angle and the valve timing of the exhaust valve Vb is set to the most retarded angle. Therefore, by a process similar to that in "control of the valve timing of the exhaust valve Vb in the engine stop control," the engine E is quickly stopped, and then stopping of the engine E is achieved with not only the pressures in the plurality of cylinders being balanced but also with the weights of the plurality of pistons 4 being balanced and with the cam torques acting from the cam surface of the intake camshaft 7 and the cam surface of the exhaust cam shaft 8 being balanced.

(b) The present disclosure is structured so that, for example, the engine E includes the valve opening and closing timing control device A that controls the intake valve Va (in the embodiment, the first valve opening and closing timing control device A1) and the valve timing of the intake valve Va is controlled in the engine stop control as is also described in the embodiment. Alternatively, the present disclosure may be structured so that the engine E includes the exhaust valve Vb (in the embodiment, the second valve opening and closing timing control device A2) and the valve timing of the exhaust valve Vb is controlled in the engine stop control.

(c) A form of control is set so that a target stop crank angle is set in advance and the engine E is stopped when the crank angle reaches the target stop crank angle.

(d) In the embodiment, the start-stop control is described as an example of the form of control of the stop control device for an internal combustion engine. However, the stop control device for an internal combustion engine according to the present disclosure is not limited to the start-stop control, and may be applied to stop control that is performed when stopping the engine E (internal combustion engine) by a human operation.

INDUSTRIAL APPLICABILITY

The present disclosure is applicable to stop control devices for internal combustion engines.

DESCRIPTION OF THE REFERENCE NUMERALS

1 Crankshaft
40 Engine Control Device (Stop Control Device for Internal Combustion Engine)
A Valve Opening and Closing Timing Control Device
A1 First Valve Opening and Closing Timing Control Device (Valve Opening and Closing Timing Control Device)
A2 Second Valve Opening and Closing Timing Control Device (Valve Opening and Closing Timing Control Device)
E Engine (Internal Combustion Engine)
Va Intake Valve
Vb Exhaust Valve

The invention claimed is:

1. A stop control device for an internal combustion engine, wherein the internal combustion engine is a four-cycle internal combustion engine and includes an electric valve opening and closing timing control device that is configured to set an opening and closing timing of an intake valve,
wherein the stop control device comprises programming to perform 1) stop control of stopping the internal combustion engine when a stop signal for stopping the internal combustion engine is acquired, 2) post-stop phase control of displacing the intake opening and closing timing of the valve opening and closing timing control device to a most retarded angle when the internal combustion engine is stopped by the stop control, and 3) pre-stop phase control of displacing the intake opening and closing timing of the valve opening and closing timing control device to a most advanced angle after the stop signal for stopping the internal combustion engine is acquired and before the internal combustion engine is stopped by the stop control.

2. The stop control device for an internal combustion engine according to claim 1, wherein the internal combustion engine includes a plurality of cylinders.

3. The stop control device for an internal combustion engine according to claim 1, wherein the stop control device further comprises programming to perform the pre-stop phase control when a crank angle of a crankshaft reaches minus 180 degrees before the internal combustion engine is stopped, the crank angle when the internal combustion engine is stopped by the stop control being 0 degrees.

4. The stop control device for an internal combustion engine according to claim 3, wherein the internal combustion engine includes a plurality of cylinders.

5. The stop control device for an internal combustion engine according to claim 1,
wherein the valve opening and closing timing control device sets is further configured to set the opening and closing timing of the exhaust valve, and
wherein the stop control device further comprises programming to perform post-stop phase control of displacing the exhaust opening and closing timing of the valve opening and closing timing control device to a most advanced angle when the internal combustion engine is stopped by the stop control, and pre-stop phase control of displacing the exhaust opening and closing timing of the valve opening and closing timing control device to a most retarded angle after the stop signal for stopping the internal combustion engine is acquired and before the internal combustion engine is stopped by the stop control.

6. The stop control device for an internal combustion engine according to claim 5, wherein the internal combustion engine includes a plurality of cylinders.

7. The stop control device for an internal combustion engine according to claim 5, wherein the stop control device further comprises programming to perform the pre-stop phase control when a crank angle of a crankshaft reaches minus 180 degrees before the internal combustion engine is stopped, the crank angle when the internal combustion engine is stopped by the stop control being 0 degrees.

8. The stop control device for an internal combustion engine according to claim 7, wherein the internal combustion engine includes a plurality of cylinders.

* * * * *